United States Patent
Ramalingam et al.

(10) Patent No.: US 9,909,006 B2
(45) Date of Patent: *Mar. 6, 2018

(54) BLENDS OF POLYETHERIMIDE SULFONE AND POLY(ARYLENE SULFIDE)

(75) Inventors: Hariharan Ramalingam, Bangalore (IN); Gurulingamurthy M. Haralur, Evansville, IN (US); Siva Kumar Sreeramagiri, Bangalore (IN); Gautam Chatterjee, Bangalore (IN); Kapil Chandrakant Sheth, Evansville, IN (US); Sanjay Braj Mishra, Evansville, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 341 days.

This patent is subject to a terminal disclaimer.

(21) Appl. No.: 13/246,586

(22) Filed: Sep. 27, 2011

(65) Prior Publication Data

US 2013/0079438 A1    Mar. 28, 2013

(51) Int. Cl.
C08G 69/26    (2006.01)
C08L 81/04    (2006.01)
C08L 81/02    (2006.01)

(52) U.S. Cl.
CPC ............... *C08L 81/04* (2013.01); *C08L 81/02* (2013.01)

(58) Field of Classification Search
USPC ........................................................ 524/606
See application file for complete search history.

(56) References Cited

U.S. PATENT DOCUMENTS

| | | |
|---|---|---|
| 3,354,129 A | 11/1967 | Edmonds, Jr. et al. |
| 3,919,177 A | 11/1975 | Campbell |
| 3,972,902 A | 8/1976 | Heath et al. |
| 4,455,410 A | 6/1984 | Giles, Jr. |
| 4,769,424 A | 9/1988 | Takekoshi et al. |
| 5,502,102 A * | 3/1996 | Nazareth ....................... 524/494 |
| 5,840,793 A | 11/1998 | Glaser |
| 8,859,651 B2 | 10/2014 | Ramalingam et al. |
| 2006/0281840 A1 | 12/2006 | Gallucci et al. |

FOREIGN PATENT DOCUMENTS

| | | |
|---|---|---|
| EP | 0158732 A1 | 10/1985 |
| JP | 61247435 A | 11/1986 |
| JP | 1299872 A | 12/1989 |
| JP | 3236930 A | 10/1991 |
| JP | 3236931 A | 10/1991 |
| WO | 2009105377 A2 | 8/2009 |

OTHER PUBLICATIONS

Ed Hallahan, Polyphenylene sulfide (PPS) in review, Reprinted from the IAPD Magazine, Apr./May 2004, pp. 1-3.*
Japanese Patent No. 1299872 (A); Publication Date: Dec. 4, 1989; Abstract Only, 1 Page.
Japanese Patent No. 3236930 (A); Publication Date: Oct. 22, 1991; Abstract Only; 1 Page.
Japanese Patent No. 3236931 (A); Publication Date: Oct. 22, 1991; Abstract Only; 1 Page.
Japanese Patent No. 4065689 (B); Publication Date: Oct. 20, 1992; Equivalent to Japanese Patent No. 61247435 and Japanese Patent No. 1774562; Abstract Only; 1 Page.
International Search Report for International Application No. PCT/US2012/057187, International Application Filing Date: Sep. 26, 2012, dated Mar. 21, 2013, 4 pages.
Written Opinion for International Application No. PCT/US2012/057187, International Application Filing Date Sep. 23, 2012, dated Mar. 21, 2013, 5 pages.

* cited by examiner

*Primary Examiner* — Robert T Butcher
(74) *Attorney, Agent, or Firm* — Cantor Colburn LLP

(57) ABSTRACT

Disclosed herein is a composition comprising a compatible blend of i) 60 to 85 weight percent of a linear poly(arylene sulfide), ii) 15 to 40 weight percent of a polyetherimide sulfone; and iii) 1 to 3 weight percent of a novolac resin having an average of 2 or more epoxy groups per molecule. Weight percent is based on the total weight of the composition. An article made from the composition has a tensile strength greater than or equal to 70 megaPascals (MPa), as determined by ASTM D638, an impact strength of greater than or equal to 3 kiloJoules per square meter (kJ/m$^2$), as determined by ASTM D256, and an elongation at break greater than or equal to 3 % as determined by ASTM D638. Methods of making the composition are also disclosed.

11 Claims, No Drawings

BLENDS OF POLYETHERIMIDE SULFONE AND POLY(ARYLENE SULFIDE)

BACKGROUND

There has long been an interest in developing thermoplastic amorphous semi-crystalline blends that exhibit good mechanical retention at high temperature and resistance to chemicals. However, these polymers generally tend to be incompatible with other polymers.

Poly(arylene sulfide)s have good thermal stability and chemical resistance. Polyetherimide sulfones exhibit good retention of mechanicals at high temperature. It would be desirable to combine the two polymers to create a blend having a combination of these desirable properties. However, polyetherimide sulfones are incompatible with poly(arylene sulfide)s. Blends of the two polymers tend to have poor physical properties which are consistent with large regions (domains) of the individual polymers instead of fine, well-dispersed domains.

Accordingly, a need exists for compatible blends of poly(arylene sulfide)s and polyetherimide sulfones.

BRIEF DESCRIPTION

The foregoing need is addressed, at least in part, by a composition comprising a compatible blend of i) 60 to 85 weight percent of a linear poly(arylene sulfide), ii) 15 to 40 weight percent of a polyetherimide sulfone; and iii) 1 to 3 weight percent of a novolac resin having an average of 2 or more epoxy groups per molecule. Weight percent is based on the total weight of the composition. An article made from the composition has a tensile strength greater than or equal to 70 megaPascals (MPa), as determined by ASTM D638, an impact strength of greater than or equal to 3 kiloJoules per square meter (kJ/m$^2$), as determined by ASTM D256, and an elongation at break greater than or equal to 3% as determined by ASTM D638.

DETAILED DESCRIPTION

It was found that compositions comprising 60 to 85 weight percent of a linear poly(arylene sulfide), 15 to 40 weight percent of a polyetherimide sulfone, and 1 to 3 weight percent of a novolac resin having 2 or more epoxy groups per molecule have improved physical properties compared to similar compositions without the epoxy containing compound. An article made from the composition has a tensile strength greater than or equal to 70 MPa, as determined by ASTM D638, an impact strength of greater than or equal to 3 KJ/m$^2$, as determined by ASTM D256, and an elongation at break greater than or equal to 3% as determined by ASTM D638. This combination of physical properties is not obtained using branched poly(arylene sulfide) in place of the linear poly(arylene sulfide). This combination of properties is also not obtained using alternate polymeric compatibilizers in place of the novolac resin. Furthermore, this combination of properties is not obtained using less of the novolac resin.

All ASTM tests were performed as required by the 2003 edition of the Annual Book of ASTM Standards unless otherwise indicated. All notched and unnotched Izod data and values were/are determined according to ASTM D256 at 23° C. as described in the Examples section unless another temperature has been specified. All tensile modulus, tensile strength, and elongation to break data and values were/are determined according to ASTM D638 as described in the Examples section In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to distinguish one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

The polyetherimide sulfone comprises structural units derived from a dianhydride and a diamine. Exemplary dianhydrides have the formula (I)

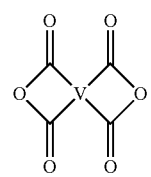

(I)

wherein V is a tetravalent linker selected from the group consisting of substituted or unsubstituted, saturated, unsaturated or aromatic monocyclic and polycyclic groups having 5 to 50 carbon atoms, substituted or unsubstituted alkyl groups having 1 to 30 carbon atoms, substituted or unsubstituted alkenyl groups having 2 to 30 carbon atoms and combinations comprising at least one of the foregoing linkers. Suitable substitutions and/or linkers include, but are not limited to, carbocyclic groups, aryl groups, ethers, sulfones, sulfides amides, esters, and combinations comprising at least one of the foregoing. Exemplary linkers include, but are not limited to, tetravalent aromatic radicals of formula (II), such as:

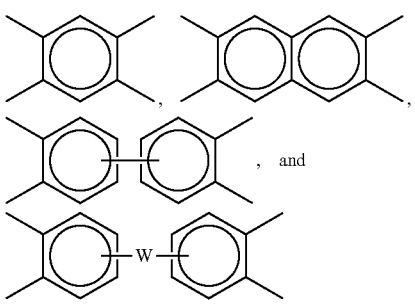
(II)

wherein W is a divalent moiety such as —O—, —S—, —C(O)—, —SO$_2$—, —SO—, —C$_y$H$_{2y}$- (y being an integer of 1 to 20), and halogenated derivatives thereof, including perfluoroalkylene groups, or a group of the formula —O—Z—O— wherein the divalent bonds of the —O— or the —O—Z—O— group are in the 3,3',3,4',4,3', or the 4,4' positions, and wherein Z includes, but is not limited to, divalent moieties of formula (III)

(III)

wherein Q includes, but is not limited to, a divalent moiety comprising —O—, —S—, —C(O)—, —SO$_2$—, —SO—, —C$_y$H$_{2y}$— (y being an integer from 1 to 20), and halogenated derivatives thereof, including perfluoroalkylene groups. In some embodiments the tetravalent linker V is free of halogens.

In one embodiment, the dianhydride comprises an aromatic bis(ether anhydride). Examples of specific aromatic bis(ether anhydride)s are disclosed, for example, in U.S. Pat. Nos. 3,972,902 and 4,455,410, which are incorporated by reference herein. Illustrative examples of aromatic bis(ether anhydride)s include: 2,2-bis[4-(3,4-dicarboxyphenoxy)phenyl]propane dianhydride (bisphenol-A dianhydride); 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, as well as mixtures comprising at least two of the foregoing.

The bis(ether anhydride)s can be prepared by hydrolysis, followed by dehydration, of the reaction product of a nitro substituted phenyl dinitrile with a metal salt of dihydric phenol compound in the presence of a dipolar, aprotic solvent.

A chemical equivalent to a dianhydride may also be used. Examples of dianhydride chemical equivalents include tetrafunctional carboxylic acids capable of forming a dianhydride and ester or partial ester derivatives of the tetra functional carboxylic acids. Mixed anhydride acids or anhydride esters may also be used as an equivalent to the dianhydride. As used throughout the specification and claims, "dianhydride" will refer to dianhydrides and their chemical equivalents.

In some embodiments the dianhydride is selected from the groups consisting of bisphenol-A dianhydride, oxydiphthalic anhydride (ODPA), and combinations thereof. Oxydiphthalic anhydride has the general formula (IV):

(IV)

and derivatives thereof as further defined below.

The oxydiphthalic anhydrides of formula (IV) include 4,4'-oxybisphthalic anhydride, 3,4'-oxybisphthalic anhydride, 3,3'-oxybisphthalic anhydride, and any mixtures thereof. For example, the oxydiphthalic anhydride of formula (IV) may be 4,4'-oxybisphthalic anhydride having the following formula (V):

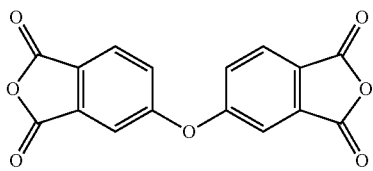

(V)

The term oxydiphthalic anhydrides includes derivatives of oxydiphthalic anhydrides which may also be used to make the polyimide. Examples of oxydiphthalic anhydride derivatives which can function as a chemical equivalent for the oxydiphthalic anhydride in polyimide forming reactions include oxydiphthalic anhydride derivatives of the formula (VI):

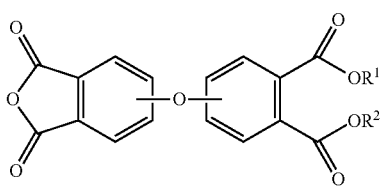

(VI)

wherein $R^1$ and $R^2$ of formula VI can be, independently at each occurrence, any of the following: hydrogen; a $C_1$-$C_8$ alkyl group; an aryl group. $R^1$ and $R^2$ can be the same or different to produce an oxydiphthalic anhydride acid, an oxydiphthalic anhydride ester, and an oxydiphthalic anhydride acid ester.

Derivatives of oxydiphthalic anhydrides may also be of the following formula (VII):

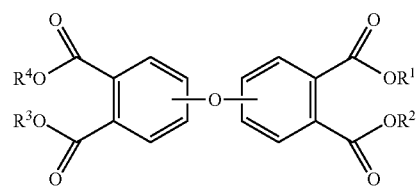

(VII)

wherein $R^1$, $R^2$, $R^3$, and $R^4$ of formula (VII) can be, independently at each occurrence, any of the following: hydrogen, a $C_1$-$C_8$ alkyl group, an aryl group. $R^1$, $R^2$, $R^3$, and $R^4$ can be the same or different to produce an oxydiphthalic acid, an oxydiphthalic ester, and an oxydiphthalic acid ester.

Useful diamines include diamino diaryl sulfones and combinations thereof. Diamino diaryl sulfones (DAS) have the general formula (X):

$$H_2N—Ar^1—SO_2—Ar^2—NH_2 \qquad (X)$$

wherein $Ar^1$ and $Ar^2$ independently are an aryl group containing a single or multiple rings. Several aryl rings may be linked together, for example through ether linkages, sulfone linkages or more than one sulfone linkages. The aryl rings may also be fused. In one embodiment $Ar^1$ and $Ar^2$ independently comprise 5 to 12 carbons. In one embodiment $Ar^1$ and $Ar^2$ are both phenyl groups.

In some embodiments the polyetherimide sulfone comprises structural units having the formula (XI)

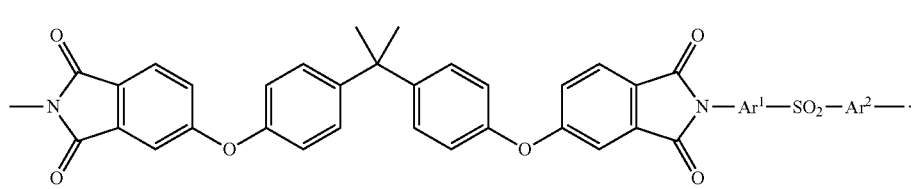

(XI)

In some embodiments the polyetherimide sulfone comprises structural units having the formula (XII)

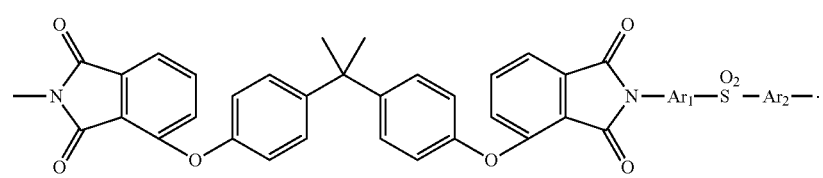

(XII)

The polyetherimide sulfone may comprise structural units having the formula (XI) and structural units having the formula (XII).

The polyetherimide sulfone may be present in an amount of 15 to 40 weight percent, based on the total weight of the composition. Within this range the amount of polyetherimide sulfone can be greater than or equal to 20 weight percent. Also within this range the amount of polyetherimide sulfone can be less than or equal to 35 weight percent.

Poly(arylene sulfide)s are known polymers containing arylene groups separated by sulfur atoms. They include poly(phenylene sulfide)s, for example poly(phenylene sulfide) and substituted poly(phenylene sulfide)s. Typical poly(arylene sulfide) polymers comprise at least 70 molar %, preferably at least 90 molar %, of recurring units of the following structural formula:

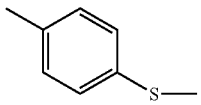

The poly(arylene sulfide) is a linear polymer. Linear poly(arylene sulfide) may be prepared by, for example, a process disclosed in U.S. Pat. Nos. 3,354,129 or 3,919,177 both of which are incorporated herein by reference. Linear poly(arylene sulfide) is commercially available from Ticona as Fortron® PPS and from Chevron Phillips as Ryton® PPS.

The poly(arylene sulfide) may be functionalized or unfunctionalized. If the poly(arylene sulfide) is functionalized, the functional groups may include, but are not limited to, amino, carboxylic acid, metal carboxylate, disulfide, thio and metal thiolate groups. One method for incorporation of functional groups into poly(arylene sulfide) can be found in U.S. Pat. No. 4,769,424, incorporated herein by reference, which discloses incorporation of substituted thiophenols into halogen substituted poly(arylene sulfide). Another method involves incorporation of chlorosubstituted aromatic compounds containing the desired functionality reacted with an alkali metal sulfide and chloroaromatic compounds. A third method involves reaction of poly(arylene sulfide) with a disulfide containing the desired functional groups, typically in the melt or in a suitable high boiling solvent such as chloronaphthalene.

Though the melt viscosity of poly(arylene sulfide) is not particularly limited so far as the moldings which can be obtained, the melt viscosity can be greater than or equal to 100 Poise and less than of equal to 10,000 poise at a melt processing temperature of 300 to 350° C.

The poly(arylene sulfide) may also be treated to remove contaminating ions by immersing the resin in deionized water or by treatment with an acid, typically hydrochloric acid, sulfuric acid, phosphoric acid or acetic acid as found in Japanese Kokai Nos. 3236930-A, 1774562-A, 12299872-A and 3236931-A. For some product applications, it is preferred to have a very low impurity level in the poly(arylene sulfide), represented as the percent by weight ash remaining after burning a sample of the poly(arylene sulfide). The ash content of the poly(arylene sulfide) can be less than about 1% by weight, more specifically less than about 0.5% by weight, or even more specifically less than about 0.1% by weight.

The poly(arylene sulfide) is present in an amount of 60 to 85 weight percent, based on the total weight of the composition. Within this range the amount of poly(arylene sulfide) can be greater than or equal to 65 weight percent. Also within this range the amount of poly(arylene ether) can be less than or equal to 75 weight percent.

The novolac resin has an average of greater than or equal to 2 pendant epoxy groups per molecule. In some embodiments the novolac has an average of greater than or equal to 6 pendant epoxy groups per molecule, or, more specifically, an average of greater than or equal to 20 pendant epoxy groups per molecule or, more specifically, an average of greater than or equal to 50 pendant epoxy groups per molecule. Without being bound by theory it is believed that the novolac resin interacts with the linear poly(arylene sulfide), the polyetherimide sulfone, or both. This interaction may be chemical (e.g. grafting) and/or physical (e.g. affecting the surface characteristics of the disperse phases). When the interaction is chemical, the epoxy groups of the novolac resin may be partially or completely reacted with the linear poly(arylene sulfide), the polyetherimide sulfone, or both such that the composition comprises a reaction product.

The novolac resin is made by reacting a phenol with formaldehyde. The term "phenol" as used herein includes phenyl, aryl, and fused aromatic rings having a hydroxyl group. The molar ratio of formaldehyde to phenol is less than 1. The novolac resin is functionalized with epoxy groups by reacting the novolac resin with epichlorohydrin in the presence of sodium hydroxide as a catalyst. The novolac resin can have an average molecular weight of 500 to 2500 Daltons. Within this range the novolac resin can have a molecular weight greater than or equal to 550 Daltons. Also within this range the novolac resin can have a molecular weight less than or equal to 900 Daltons.

The composition comprises 1 weight percent to 3 weight percent of novolac resin, based on the total weight of the composition. Within this range, the composition can comprise less than or equal to 2.5 weight percent, or, more specifically less than or equal to 2 weight percent.

The composition may further comprise an additive or combination of additives. Exemplary additives include electrically conductive fillers, reinforcing fillers, stabilizers, lubricants, mold release agents, inorganic pigments, UV absorbers; antioxidants, plasticizers; anti-static agents; foaming agents; blowing agents; metal deactivators and combinations comprising one or more of the foregoing. Examples of electrically conductive fillers include conductive carbon black, carbon fibers, metal fibers, metal powder, carbon nanotubes, and the like, and combinations comprising any one of the foregoing electrically conductive fillers. Examples of reinforcing fillers include glass beads (hollow and/or solid), glass flake, milled glass, glass fibers, talc, wollastonite, silica, mica, kaolin or montmorillonite clay, silica, quartz, barite, and the like, and combinations comprising any of the foregoing reinforcing fillers. Antioxidants can be compounds such as phosphites, phosphonites and hindered phenols or mixtures thereof. Phosphorus containing stabilizers including triaryl phosphite and aryl phosphonates are of note as useful additives. Difunctional phosphorus containing compounds can also be employed. Stabilizers may have a molecular weight greater than or equal to 300. In some embodiments, phosphorus containing stabilizers with a molecular weight greater than or equal to 500 are useful. Phosphorus containing stabilizers are typically present in the composition at 0.05-0.5% by weight of the formulation. Flow aids and mold release compounds are also contemplated.

The thermoplastic composition can be prepared melt mixing or a combination of dry blending and melt mixing.

Melt mixing can be performed in single or twin screw type extruders or similar mixing devices which can apply a shear and heat to the components. Melt mixing can be performed at temperatures greater than or equal to the melting temperatures of the block copolymers and less than the degradation temperatures of either of the block copolymers.

All of the ingredients may be added initially to the processing system. In some embodiments, the ingredients may be added sequentially and/or through the use of one or more master batches. It can be advantageous to apply a vacuum to the melt through one or more vent ports in the extruder to remove volatile impurities in the composition.

In some embodiments the method of making the composition comprises melt mixing the polyetherimide and the polyetherimide sulfone to form an initial composition which can be pelletized prior to melt mixing the initial composition with the linear poly(arylene sulfide) and polymeric compatibilizer.

In some embodiments melt mixing is performed using an extruder and the composition exits the extruder in a strand or multiple strands. The shape of the strand is dependent upon the shape of the die used and has no particular limitation.

EXAMPLES

The examples described below used the materials shown in Table 1.

TABLE 1

| Material | Description | Source |
|---|---|---|
| Polyetherimide sulfone | EXTEM ® XH 1005 | SABIC Innovative Plastics |
| Polyetherimide sulfone | EXTEM ® VH 1003 | SABIC Innovative Plastics |
| Linear poly(phenylene sulfide) | Fortron ® 0214B | Ticona |
| Branched poly(phenylene sulfide) | Ryton ® P4 | Chevron Phillips |
| Branched poly(phenylene sulfide) | Susteel ® PPS 040 | TOSOH Corporation |
| Branched poly(phenylene sulfide) | Susteel ® PPS 040 | TOSOH Corporation |
| Polymeric compound having an average of 24 pendant epoxy per molecule | Joncryl ® ADR4368 | BASF |
| Polymeric compound having an average of 17 pendant epoxy per molecule | Bondfast E | Sumitomo |
| Epoxy cresol novolac resin (ECN) | Poly(o-cresyl glycidyl ether)-co-formaldehyde | Aldrich |

Techniques & Procedures

Composition Preparation Techniques: Resin compositions were formed by melt mixing the polyetherimide sulfone and poly(phenylene sulfide)s. Blends were prepared by extrusion in a 2.5-inch twin screw, vacuum vented extruder. Compositions are listed in weight percent, based on the total weight of the composition in the tables below. The extruder was set at about 300-350° C. The blends were run at approximately 250 rotations per minute (rpm) under vacuum. The extrudate was cooled, pelletized and dried at 125° C. Test samples were injection molded at a set temperature of 340-350° C. and mold temperature of 125° C. using a 30 second cycle time.

Properties Testing: Properties were measured using ASTM test methods. All molded samples were conditioned for at least 48 hours at 50% relative humidity prior to testing.

ASTM D256: Notched Izod impact values were measured at room temperature on 3.2 millimeter thick bars as per ASTM D256. Bars were notched prior to oven aging; samples were tested at room temperature. Results are in kilojoules per square meter ($KJ/m^2$).

ASTM D638: Tensile properties were measured on 3.2 millimeter type I bars as per ASTM method D638 at 23° C. with a crosshead speed of 5 millimeters/minute. Tensile strength is reported at yield (Y), percent elongation (% Elong.) is reported at break (B). Tensile modulus, tensile strength at yield, tensile strength at break results are reported in MPa.

Examples 1-6

The purpose of these Examples was to demonstrate the effect of linear poly(arylene sulfide) and branched poly(arylene sulfide) in the presence and absence of the novolac resin. Compositions were made in accordance to the composition preparation procedure described above. The compositions were tested as described above and results are shown in Table 2.

TABLE 2

|  | 1 | 2* | 3* | 4* | 5* | 6* |
|---|---|---|---|---|---|---|
| EXTEM XH 1005 | 30 | 30 | 30 | 30 | 30 | 30 |
| Fortron 0214B | 70 | 70 |  |  |  |  |
| Susteel PPS 040 (Branched PPS) |  |  | 70 | 70 |  |  |
| Susteel PPS 070 (Branched PPS) |  |  |  |  | 70 | 70 |
| ECN | 1 |  |  | 1 |  | 1 |
| Tensile Strength | 74 | 59 | 30 | 41 | 60 | 69 |
| % Elongation at break | 3 | 2 | 1 | 1 | 2 | 3 |
| Impact strength | 3.8 | 2.3 | 2.8 | 2.7 | 3.1 | 2.7 |

*Comparative Example

A comparison of Examples 1 and 2 shows that in compositions comprising a linear poly(arylene sulfide) there is a marked increase in tensile strength, elongation at break and impact strength in the presence of a novolac resin. Examples 3-6 show that this improvement is not seen in examples comprising a branched poly(arylene sulfide). In Examples 3-6 tensile strength increases when a novolac resin is used but impact strength decreases. None of the compositions in Examples 3-6 have a combination of a tensile strength greater than or equal to 70 MPa, an impact strength of greater than or equal to 3 $kJ/m^2$, and an elongation at break greater than or equal to 3%.

The results are further unexpected because (as evidenced by the % Elongation at break and Impact strength results) the combination of a linear poly(arylene sulfide) and polyetherimide sulfones (two materials known to be brittle), when used in conjunction with novolac resin having an average of 2 or more epoxy groups per molecule, produce a composition that exhibits a ductility higher than the ductility of the polyetherimide sulfone and the linear poly(arylene sulfide) individually.

Conversely, our results show that when a branched poly(arylene sulfide) material is used with a polyetherimide sulfone in conjunction with a novolac resin having an average of 2 or more epoxy groups per molecule (and without such a novalac resin), the resulting composition does not produce a composition that exhibits a ductility higher than the ductility of the polyetherimide sulfone and the branched poly(arylene sulfide) individually, (as evidenced by impact strength results).

Examples 7-13

The purpose of these Examples was to demonstrate the effect of differing amounts of novolac resin as well as the effect of alternate polymeric compounds having pendant epoxy groups in compositions having the poly(arylene sulfide) as the major resin. Compositions were made in accordance with the composition preparation procedure described above. The compositions were tested as described above and results are shown in Table 3.

TABLE 3

|  | 7 | 8* | 9* | 10* | 11* | 12* | 13* |
|---|---|---|---|---|---|---|---|
| EXTEM XH1005 | 30 | 30 | 30 | 30 | 30 | 30 | 30 |
| Fortron 0214B | 70 | 70 | 70 | 70 | 70 | 70 | 70 |
| ECN | 1 |  |  | 0.5 |  |  |  |
| Joncryl ADR 4368 |  | 1 |  |  | 0.5 |  |  |
| Bond Fast E |  |  |  |  |  | 0.5 | 1 |
| Tensile Strength | 74 | 74 | 59 | 67 | 72 | 53 | 43 |
| Tensile Modulus | 2857 | 3437 | 3430 | 3291 | 3413 | 3471 | 3456 |
| % Elongation @ break | 3 | 2 | 2 | 2 | 2 | 2 | 1 |
| Impact strength | 3.8 | 2.8 | 2.3 | 2.7 | 2.1 | 2.1 | 2.1 |

*Comparative example

These examples demonstrate that only by using a novolac resin in the required amount yields a composition capable of achieving a combination of a tensile strength greater than or equal to 70 MPa, an impact strength of greater than or equal to 3 kJ/m$^2$, and an elongation at break greater than or equal to 3%.

Examples 14-15

The purpose of these Examples was to further demonstrate the effect the novolac resin. Compositions were made using the one pass method described above. The compositions were tested as described above and results are shown in Table 4.

TABLE 4

|  | 14 | 15* |
|---|---|---|
| EXTEM VH 1003 | 25 | 25 |
| Fortron 0214B | 75 | 75 |
| ECN | 1 |  |
| Tensile Strength | 75 | 62 |
| Tensile Modulus | 3537 | 3135 |
| % Elongation at break | 9 | 3 |
| Impact Strength | 6.3 | 3.9 |

*Comparative example

Polyetherimide sulfones and poly(arylene sulfide)s are immiscible and show excellent compatibility when combined with a novolac resin having an average of at least two epoxy groups per molecule. The blends exhibit excellent processability with improved tensile and impact performance.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A composition comprising a compatible blend of i) 65 to 75 weight percent of a linear poly (phenylene sulfide), ii) 20 to 35 weight percent of a polyetherimide sulfone comprising structural units having the formula

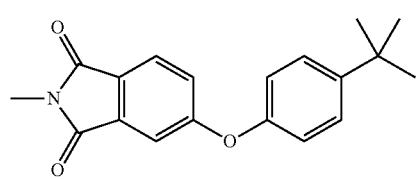

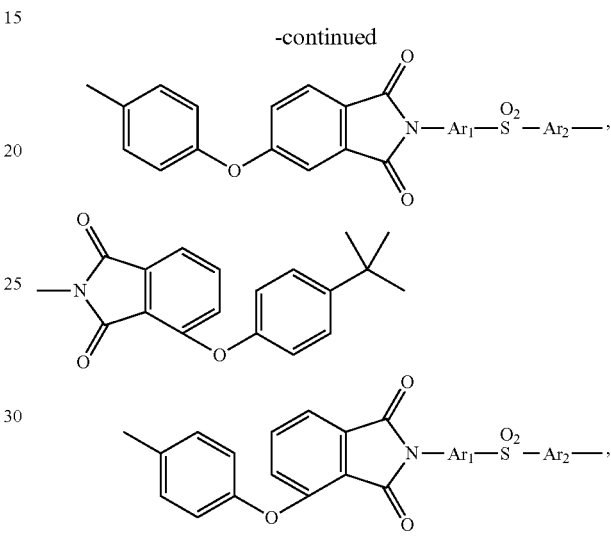

or a combination thereof; and iii) 1 to 3 weight percent of a novolac resin having an average of 2 or more epoxy groups per molecule, wherein weight percent is based on the total weight of the composition, and an article made from the composition has a tensile strength greater than or equal to 70 megaPascals (MPa), as determined by ASTM D638, an impact strength of greater than or equal to 3 kiloJoules per square meter (kJ/m$^2$), as determined by ASTM D256, and an elongation at break greater than or equal to 3% as determined by ASTM D638.

2. The composition of claim 1, wherein the novolac resin has an average of 6 or more epoxy groups per molecule.

3. The composition of claim 1, wherein the novolac resin has an average of 20 or more epoxy groups per molecule.

4. The composition of claim 1, further comprising a reinforcing filler.

5. The composition of claim 4 wherein the reinforcing filler comprises glass beads, glass flake, milled glass, glass fibers, or combinations thereof.

6. A composition comprising the reaction product of melt blending i) 65 to 75 weight percent of a linear poly (phenylene sulfide), ii) 20 to 35 weight percent of a polyetherimide sulfone comprising structural units having the formula

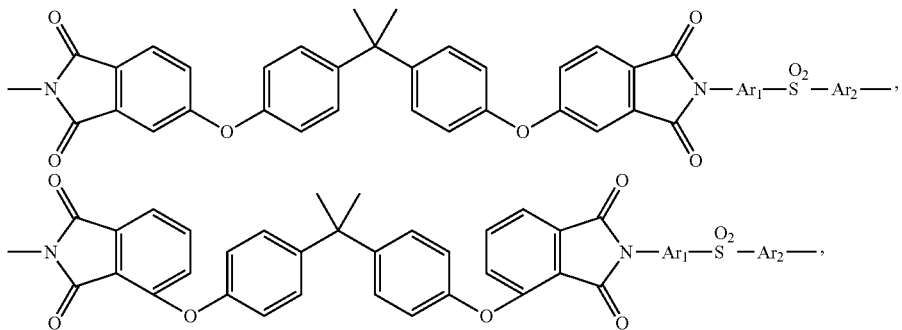

or a combination thereof; and iii) 1 to 3 weight percent of a novolac resin having an average of 2 or more epoxy groups per molecule, wherein weight percent is based on the total weight of the composition, wherein an article made from the composition has a tensile strength greater than or equal to 70 megaPascals (MPa), as determined by ASTM D638, an impact strength of greater than or equal to 3 kiloJoules per square meter (kJ/m$^2$), as determined by ASTM D256, and an elongation at break greater than or equal to 3% as determined by ASTM D638.

7. The composition of claim 6, wherein the novolac resin has an average of 6 or more epoxy groups per molecule.

8. The composition of claim 7, wherein the novolac resin has an average of 20 or more epoxy groups per molecule.

9. The composition of claim 6, wherein the composition comprises 20 to 35 weight percent of the polyetherimide sulfone, based on the total weight of the composition.

10. The composition of claim 1, wherein the polyetherimide sulfone is derived from dianhydrides comprising a combination of bisphenol-A dianhydride and oxydiphthalio anhydride, and a diamino diphenyl sulfone.

11. The composition of claim 6, wherein the poiyetherimide sulfone is derived from dianhydrides comprising a combination of bisphenol-A dianhydride and oxydiphthalic anhydride, and a diamino diphenyl sulfone.

* * * * *